United States Patent [19]
Williams et al.

[11] Patent Number: 5,269,620
[45] Date of Patent: Dec. 14, 1993

[54] SECONDARY SECURING ARRANGEMENT FOR SPIGOT MOUNTED COMPONENTS

[75] Inventors: George H. Williams; Robert J. Peirce, both of Bristol, Great Britain

[73] Assignee: British Aerospace Public Limited Company, London, England

[21] Appl. No.: 817,817

[22] Filed: Jan. 8, 1992

[30] Foreign Application Priority Data

Jan. 11, 1991 [GB] United Kingdom ............... 9100617

[51] Int. Cl.$^5$ .................................................. F16B 2/14
[52] U.S. Cl. ................................... 403/316; 403/371; 403/326; 403/259; 411/353; 285/82
[58] Field of Search ............... 403/326, 371, 315-317, 403/259, 261, 289, 367, 368, 370, 329; 411/337, 352, 353, 517; 285/82, 319

[56] References Cited

U.S. PATENT DOCUMENTS

| | | | |
|---|---|---|---|
| 1,867,950 | 7/1932 | Norley | 403/316 |
| 2,222,694 | 11/1940 | Thomas | 403/316 X |
| 2,761,484 | 9/1956 | Sternick et al. | 411/353 |
| 3,917,425 | 11/1975 | Allaben, Jr. | |
| 3,918,779 | 11/1975 | Halliger et al. | |
| 4,597,686 | 7/1986 | Petersen | 403/316 X |
| 4,813,808 | 3/1989 | Gehrke | |
| 4,934,888 | 6/1990 | Corsmeier et al. | 411/517 X |

FOREIGN PATENT DOCUMENTS

| | | |
|---|---|---|
| 3046420 | 7/1982 | Fed. Rep. of Germany . |
| 2186082 | 1/1974 | France . |
| 2217587 | 9/1974 | France . |
| 2550832 | 2/1985 | France . |
| 2184201 | 6/1987 | United Kingdom . |

*Primary Examiner*—Randolph A. Reese
*Assistant Examiner*—Harry C. Kim
*Attorney, Agent, or Firm*—Cushman, Darby & Cushman

[57] ABSTRACT

A secondary securing member is provided (19,28,29,30) for securing a first component (11) to a second component (13) when primary securing member (17) is inadvertently removed. The first component (11) includes an outwardly extending spigot (12) slidably engaging the secondary securing member (19, 28,29,30). The second component (13) is assembled and secured by a primary securing member means (17). Thus if in use, the primary securing member (17) is inadvertently removed, the secondary securing member (19, 28, 29, 30) insures limited axial displacement but no separation of the second component (13) from the first component (11).

5 Claims, 3 Drawing Sheets

SECONDARY SECURING ARRANGEMENT FOR SPIGOT MOUNTED COMPONENTS

BACKGROUND TO THE INVENTION

This invention relates to secondary securing arrangements for ensuring the retention of a spigot mounted component in the event of loss of primary securing means.

In certain applications, for example the pivotal attachment of an aircraft wing flap to its supporting carriage, loss of primary securing means for whatever reason, may have catastrophic results. As a consequence there is a requirement for secondary securing means which is effective in maintaining the in-service integrity of a flight system but which is lightweight and compact. It is the object of the present invention to provide such an arrangement.

SUMMARY OF THE INVENTION

According to the present invention there is provided a secondary securing arrangement for securing a first component to a second component when primary securing means is inadvertently removed, said first component including an outwardly extending spigot slidably engaging said secondary securing means and to which said second component is assembled and secured by said primary securing means the arrangement being such that if in use, said primary securing means is inadvertently removed, said secondary securing means ensures limited axial displacement but no separation of said second component from said first component.

The spigot may include a recess extending therearound which may be annular in form and may extend completely around the spigot or be broken in one or more places, for receiving and slidably retaining the secondary securing means. The spigot may include a concentric shoulder having an inner tapered face fairing outwardly from the spigot shank.

The secondary securing means may include means to engage the second component to prevent same sliding off the spigot in the form of one or more projections extending radially outwardly from one or more axially extending spines which have limited radial flexibility. The secondary securing device may also comprise a split base ring having two or more said spines projecting therefrom, each spine terminating in a said projection comprising a tapered end, and said secondary securing device being desirably manufactured to have spring like properties.

The secondary securing means is preferably positioned upon the spigot such that the base ring engages the recess in the spigot and the spines extend axially along it, said secondary securing means preferably being configured to engage the second component when assembled such that, if in use, the primary securing means is inadvertently removed, displacement of said second component is limited to permissible axial displacement of the base ring in said recess and the tapered end stop of each spine in sliding engagement with the tapered face of said spigot shoulder imposing a restraining clamping force on said second component.

BRIEF DESCRIPTION OF THE DRAWINGS

One embodiment of the invention will now be described by way of example only and with reference to the following drawings in which.

DESCRIPTION OF PREFERRED EMBODIMENT

Figure 1:
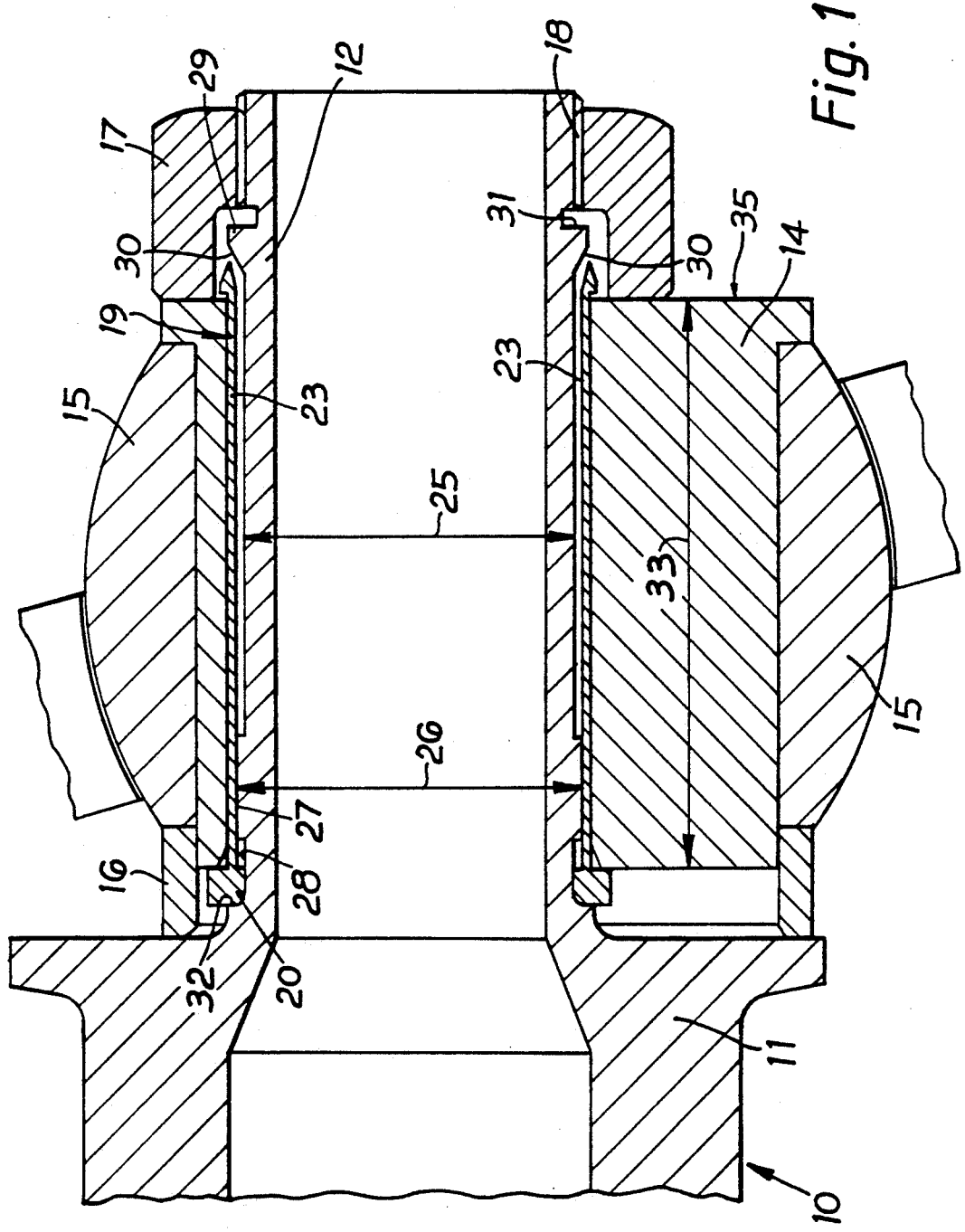
FIG. 1 illustrates a longitudinal cross-section through a spigot mounted component assembly in accordance with the invention.
Figure 2:
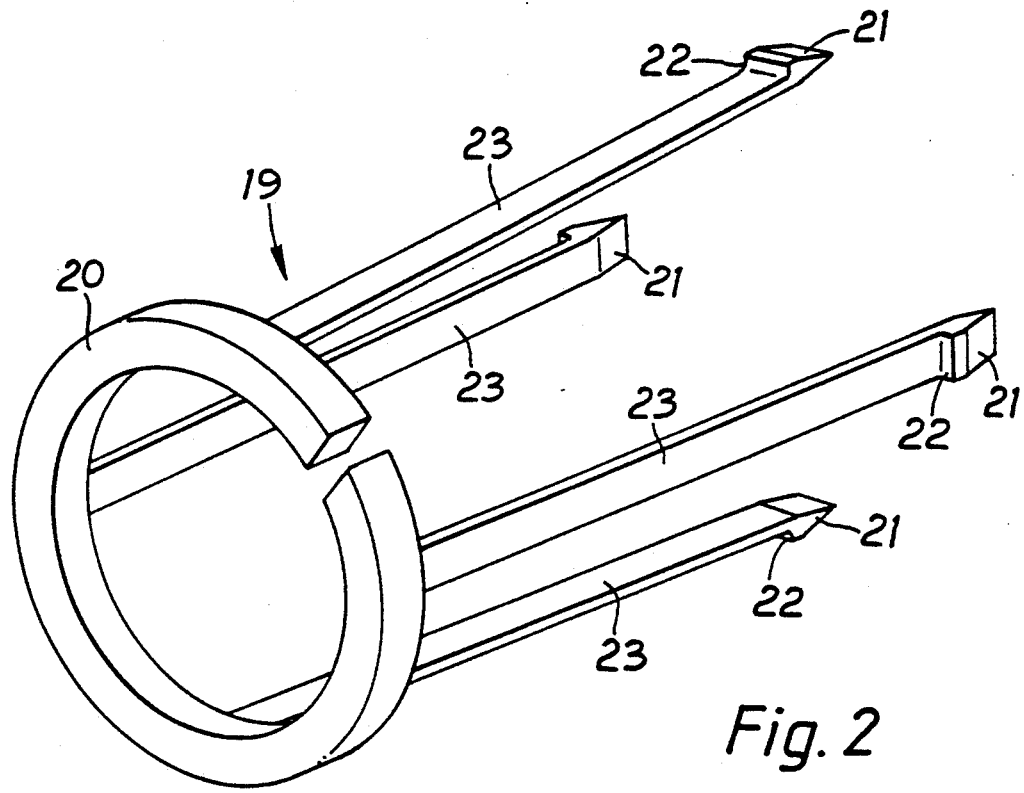
FIG. 2 shows pictorially, a secondary securing device for use in accordance with the invention.

Referring to the drawings, FIG. 1 illustrates, in cross-section, a machined component 10 comprising a barrel-shaped body portion 11 and a spigot 12 extending therefrom. Mounted upon the spigot is a self-aligning bearing assembly 13 which includes a spherical ball eccentric 14 and a spherical bearing 15. The self-aligning bearing assembly 13 i clamped in position upon the spigot 12 by means of a concentric sleeve 16 and a retaining nut 17 engaging the threaded portion 18 of the spigot. Generally, the nut will be locked by well known means, not illustrated here.

The assembly further includes a concentric secondary securing device 19 as illustrated in detail in FIGS. 2-5 inclusive. The device, which is manufactured to have suitable spring-like properties, comprises a split base ring 20 having four equally spaced spines 23 projecting outwardly therefrom. Each spine may be of constant thickness along its length or slightly tapering and terminates in a tapered end stop 21, the integrally formed step 22 providing one element of the secondary restraint means, a further element being the step 24 formed at the intersection of the base ring 20 with each spine.

Referring again to FIG. 1, the securing device 19 is shown located in position. It will be further noted that the spigot 12 is machined to have a generally parallel shank diameter 25 over the greater portion of its length but, with localised intermediate portion 27 having a diameter 26 and which effectively forms a localized annular recess 28. The outward end of the spigot 12 includes an annular shoulder 29 including an inner tapered face 30 and an outer vertical face 31.

The securing device 19 is positioned such that the base ring 20 slidably engages the annular recess 28 but is clamped against movement by means of the eccentric 14.

The assembly and function of the secondary securing arrangement is more clearly described with reference to FIGS. 3, 4 and 5 which are localized schematic cross-sections for reasons of clarity and therefore do not precisely conform in configuration to the arrangement of FIG. 1. The principal is nevertheless identical.

Figure 3:
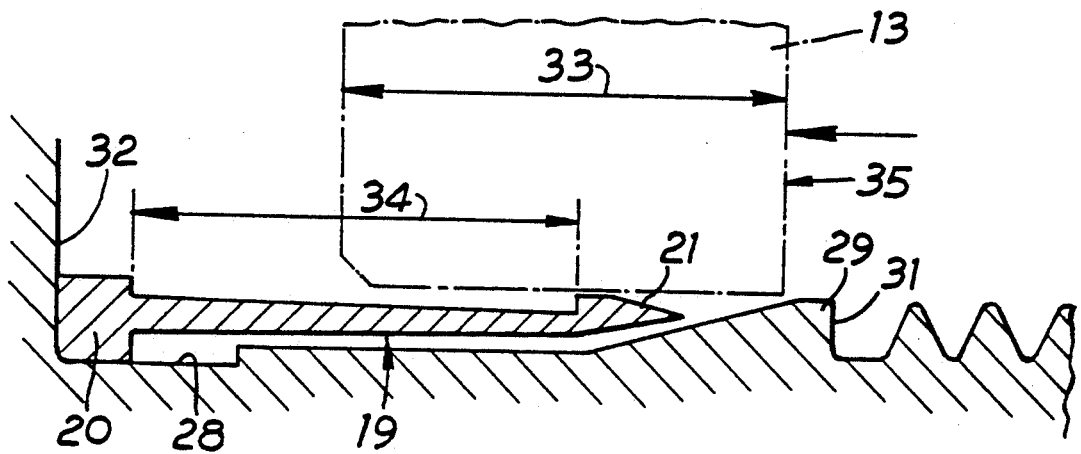
FIGS. 3, 4 and 5 illustrate, in localized schematic cross-section, the secondary securing arrangement at three different stages.
Figure 4:
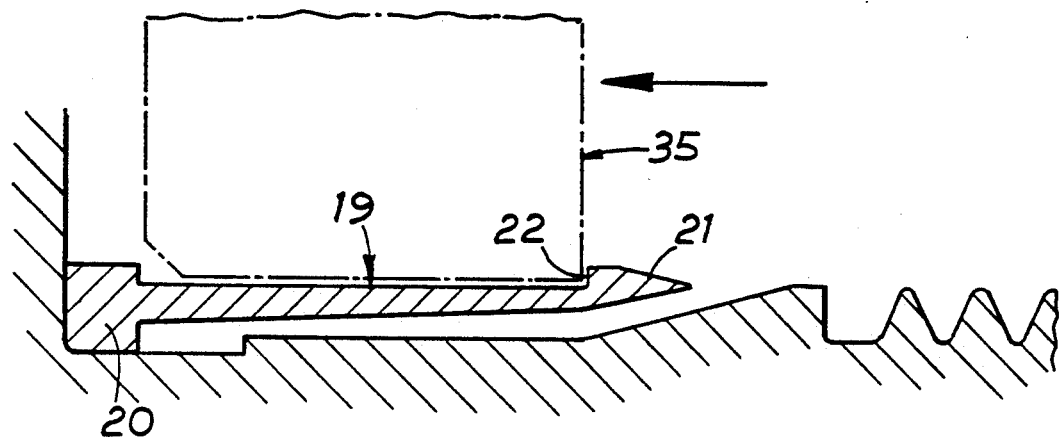

In FIG. 3, the securing device 19 is inserted over the spigot 12 until it locates into the recess 28 and is seated against the face 32. The bearing assembly 13 is inserted in direction of the arrow assembly as in FIG. 1. The width 33 of the ball eccentric 14 substantially corresponds to the rebate 34 formed by the steps 22 and 24 so that when the ball eccentric 14 is in position each spine 23 will spring outwardly such that the step 22 will engage the outward face 35 to effectively form a restraining end stop This is illustrated in FIG. 1 and 4.

Figure 5:
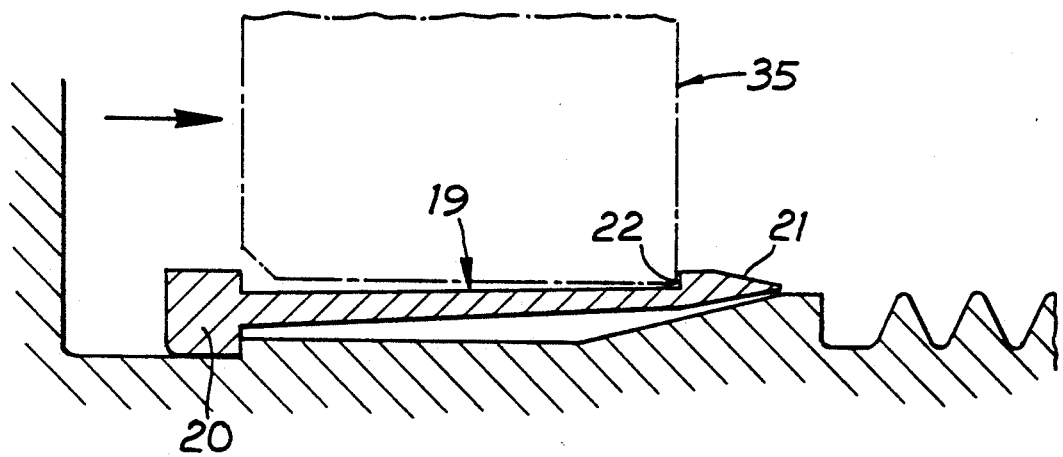

FIG. 5 illustrates the secondary securing operation in accordance with the invention. In normal service the bearing assembly 13 is held in place by the nut 17 as shown in FIG. 1 and which would normally be held secure by conventional locking means e.g. wire locking. In the unlikely event that the nut inadvertently became detached from the spigot, the lack of secondary securing and retaining means could result in separation of the bearing assembly 13 from the spigot with catastrophic results. In the embodiment described, which relates to an aircraft wing flap system, without the secondary securing feature the flap could become detached from its mounting with resultant jamming or likely loss of the aircraft. The present invention overcomes this hazard. With the nut removed, any tendency of the bearing assembly to move outwardly along the spigot will be minimised in its range of movement by associated movement of the secondary securing device. Not only will the base ring 20 move outwardly along the recess 28 to engage the outermost face of the recess but this will be accompanied by a simultaneous engagement of the tapered end stop 21 with the spigot tapered face 30 thereby imparting a wedge effect and an effective secondary securing action.

We claim:

1. A secondary securing member for securing a first component to a second component, the first component including a spigot for mounting the second component, the spigot being adapted to receive a primary securing member and the secondary securing member, the second component being disposed over the secondary securing member and engaging the spigot, the second component being secured on the spigot by the primary securing member, said secondary securing member comprising:

wedge means cooperable with a surface of the spigot whereby inadvertent removal of the primary securing member causes said secondary securing member to displace axially relative to the spigot and wedge against said surface of the spigot thereby limiting relative axial displacement of the secondary securing member and preventing separation of the first component from the second component.

2. A secondary securing member as claimed in claim 1, wherein the spigot includes a recess extending at least partially about a periphery thereof, said recess receiving and slidably retaining said secondary securing member, and wherein said surface includes a concentric shoulder having a tapered face flaring outwardly from a shank of the spigot.

3. A secondary securing member as claimed in claim 2, further comprising a split base ring having at least two spines projecting axially therefrom, each said spine terminating in a tapered end stop to define said wedge means, said split base ring being slidably engageable in said recess and each tapered end stop being cooperable with said tapered face so as to limit relative axial displacement of the secondary securing member.

4. A secondary securing member as claimed in claim 3, wherein said split base ring and said spines have spring-like properties.

5. A secondary securing member as claimed in claim 3, wherein when the primary securing member is inadvertently removed, axial displacement of the second component is limited to movement of said split base ring in said recess and said tapered end stop of each said spine being in sliding engagement with said tapered face.

* * * * *